April 25, 1933. W. E. HOKE 1,905,869

SELF LOCKING COUPLED SCREW ELEMENT

Original Filed Nov. 1, 1927

INVENTOR
William E. Hoke
BY
ATTORNEYS

Patented Apr. 25, 1933

1,905,869

UNITED STATES PATENT OFFICE

WILLIAM E. HOKE, OF BALTIMORE, MARYLAND, ASSIGNOR TO DARDELET THREADLOCK CORPORATION, OF NEW YORK, N. Y., A CORPORATION OF DELAWARE

SELF-LOCKING COUPLED SCREW ELEMENT

Original application filed November 1, 1927, Serial No. 230,300. Divided and this application filed February 26, 1931. Serial No. 518,425.

This application is a division of my pending application Serial No. 230,300 filed November 1, 1927 which has now matured into Patent No. 1,798,604, and relating to self-locking, coupled screw elements such as bolts and nuts wherein the male and female threads are designed for self-locking engagement by crosswise displacement of a thread of one class relatively to a thread of the other class in either direction to bring co-acting locking surfaces into jamming engagement.

Important objects of the present invention are to provide such a thread designed to facilitate its manufacture; to provide such a thread designed for locking engagement of its crest only with a complementary thread when displaced crosswise in one direction, and for locking engagement of its root only with the complementary thread when displaced in the opposite direction; and to provide such a thread having a single self-locking crest surface sloping in one direction and a single self-locking root surface sloping in the opposite direction, for crest-locking only when displaced crosswise in one direction upon a complementary thread and for root-locking only when displaced in the opposite direction.

Other objects of the invention will appear hereinafter.

Figure 1:
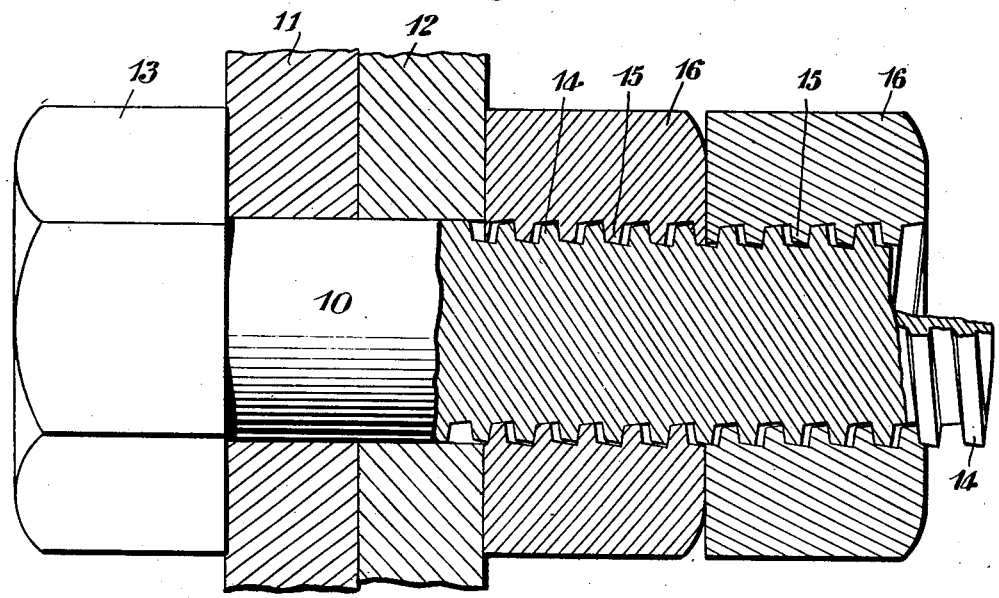
Figure 2:
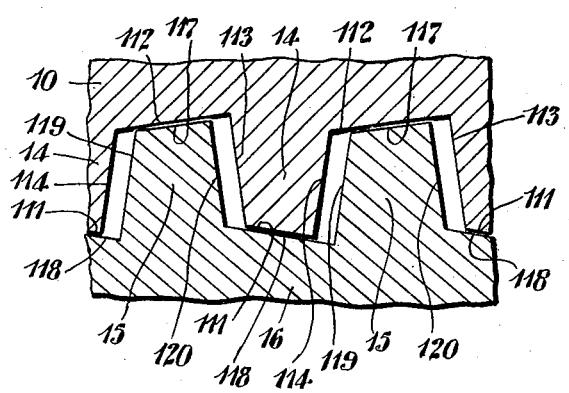

In the drawing, Fig. 1 is a view partly in longitudinal section, showing a bolt and nut assembly wherein work is clamped between a nut and the head of the bolt, two nuts having identical screw threads being screwed on the threaded end of the bolt and abutting each other, the inner nut engaging the work; and Fig. 2 a detail longitudinal sectional view upon a larger scale, showing male and female threads of the form shown in Fig. 1 in neutral position.

While I have illustrated one situation in which a double-acting thread lock is of advantage it will be understood that my invention is not limited to the use which I have illustrated.

Referring to Figs. 1 and 2, 10 designates the shank of the bolt which passes through a pair of work pieces 11 and 12 to be clamped together; 13 designates the head of the bolt which abuts at its inner end against the outer face of the work piece 11; 14 designates the male screw thread formed on that end portion of the bolt shank remote from the bolt head, and 15 designates the threads of each of two nuts 16 screwed on the threaded end of the bolt shank with the inner end of the inner nut abutting against the outer face of the work piece 12 and the inner end of the outer nut abutting against the outer end of the inner nut. The threads 15 of the two nuts are of identical cross-sectional form and pitch and are of the same pitch as the bolt thread 14. The bolt and nuts should preferably be made of metal, although other suitable materials may be used if desired.

The engaged male and female threads each have a single pair of oppositely facing, helicoidal, thread-locking-surface portions, of zero curvature transversely of the thread, and a pair of oppositely facing, helicoidal abutment surface portions of zero curvature transversely of the thread. These surfaces on each thread are so arranged that the two abutment surfaces are slightly out of axial register and so that one locking surface portion extends across the top of the thread rib while the other locking surface portion extends across the bottom of the thread groove, the locking surfaces being therefore also out of axial register.

Referring by numerals to the said surfaces, the bolt 10 has its thread 14 formed with two oppositely facing, helicoidal thread-locking surface portions 111 and 112 of zero transverse curvature, each making an angle with the axial line of the thread within the angle of friction of the co-acting thread surfaces, said portions being located at opposite sides of a helicoidal abutment surface portion 114 and sloping in opposite directions from said abutment portion toward the axial line of the thread, the surfaces 111, 112 and 114 all being at one side of the other abutment surface portion 113 of the thread, and the locking surface portion 112 being substantially wider than locking surface portion 111. Abutment surface portions 113 and 114 are of zero transverse curvature and each makes an angle with the axial line of the thread greater than the angle of friction of the co-acting thread surfaces, and said surface portions diverge from each other toward the axial line of the thread. The abutment surface portion 113 is slightly wider than abutment surface portion 114 and connects one edge of locking portion 111 of each thread convolution with one edge of locking portion 112 of an adjacent thread convolution.

Each nut 16 has its thread 15 formed with two oppositely facing, helicoidal, thread-locking surface portions 117 and 118 of zero transverse curvature, each making an angle with the axial line of the thread less than the angle of friction of the co-acting thread surfaces. Said surface portions 117 and 118 are located at opposite sides of a helicoidal abutment surface portion 120 and slope in opposite directions from said abutment portion away from the axial line of the thread, the surface portions 117, 118 and 120 all being at one side of the other abutment surface portion 119 of the thread, and the locking portion 118 being substantially wider than the locking portion 117. Abutment surface portions 119 and 120 are of zero transverse curvature and each makes an angle with the axial line of the thread greater than the angle of friction of the co-acting thread surfaces, and said surface portions diverge from each other away from the axial line of the thread, the portion 119 being slightly wider than portion 120 and connecting one edge of locking portion 117 of each thread convolution with one edge of locking portion 118 of an adjacent thread convolution.

The contours of the bolt and nut threads are corelated to permit the threads, while engaged, to assume a neutral position (shown in Fig. 2) in which there is a slight clearance between the thread-locking surface portions on the nut thread 15 and the thread-locking surface portions on the bolt thread 14 which are co-active therewith in order to facilitate initial connection of the nut with the bolt. In this neutral position there is a relatively great clearance between the abutment surface portions of the nut thread and the abutment surface portions of the bolt thread which are co-active therewith, so that the engaged threads may be displaced crosswise of each other a substantial distance in both directions axially of the threads before bringing one or the other set of co-active male and female abutment surface portions into engagement; in other words, the abutment surface portions of the engaged threads are corelated to permit substantial side-play between threads 14 and 15, and by reason of the great angle which they make with the axial line of the thread, said abutment surface portions are adapted to limit positively the extent of possible side-play.

Upon screwing a nut 16 on the bolt, the co-active thread-locking surface portions 111 and 118 of the threads 14 and 15 will be first brought into light contact and will co-act to initially advance the nut inward at the pitch rate. If a single nut is to be used to clamp the work pieces 11 and 12, the nut will be screwed tightly up against the outer face of work piece 12 until the work pieces are firmly clamped between the nut and the head of the bolt. The re-action forces generated by the clamping action will, after the nut engages the work, slow down the rate of advance of the nut per turn to less than the pitch rate so that, as the nut is tightened up, the nut and bolt threads will be additionally displaced in the same direction beyond initial screwing position until the abutment surface portions 120 and 113 of threads 14 and 15 come into engagement, whereupon crosswise displacement will be positively arrested with the thread-locking surface portions 111 and 118 jammed into self-locking frictional engagement with each other. When the threads are so displaced, accidental loosening of the nut is impossible since, in riding up of the thread-locking surface portion 118 of the nut thread on the thread-locking surface portion 111 of the bolt thread, the nut is very slightly distended or expanded radially, so that coacting thread-locking surface portions are gripped together under the elastic tension of the expanded nut. As these mutually gripping surface portions of the bolt and nut threads lie within the angle of friction of the surfaces in contact, it will be obvious that they are self-locked or self-held against accidental relative turning and also against accidental sliding toward neutral position even if axial play should develop between the work and the bolt head and nut.

After the threads assume self-holding position the nut may be still further tightened, if it is necessary or desirable to do so in order to clamp the work with the desired degree of firmness, the abutment surface portions 113 and 120 of the bolt and nut threads co-acting in this case to advance the nut against the work at the pitch rate without opposing additional stresses on the engaged thread-locking surface portions, so that the nut may be screwed up as firmly as desired, or as the work will permit, without danger of bursting the nut. The thread-locking and abutment surface portions of the threads are corelated to permit full jamming of the co-active locking surface portions, and arrest of the jamming action, by the co-active abutment surface portions within a proper safety limit determined by the elastic limit of the nut. It will be evident that if a nut is displaced on the bolt in the opposite direction the thread-locking portions 112 and 117 co-act for locking, and abutment portions 114 and 119 positively limit the jamming action. A self-locking action may be obtained whether the threads be displaced in one direction or the other.

In Fig. 1 is shown an application of the invention in which two superposed or abutting nuts are used to clamp work pieces 11 and 12 on the bolt between the bolt head and the innermost nut. By this arrangement a self-locking engagement of two nut threads with different sides of the bolt thread is obtained. This double locking effect gives an added factor of safety and also (by reason of the fact that the reaction between the abutting ends of the two nuts when the outer nut is tightened up displaces the two nut threads in opposite directions crosswise of the bolt thread to cause the locking surface portions at different sides of the two nut threads to bind on the locking surface portions at opposite sides of the bolt thread, with abutment surface portions at different sides of the two nut threads abutting abutment surface portions at opposite sides of the bolt thread, as shown in Fig. 1) prevents any possibility of either nut shifting toward neutral position under any possible shocks or vibrations to which the bolt, nuts, or work pieces may be subjected even when considerable play develops between the work and the bolt head and the work-engaging nut, from wear or other causes.

Upon relative crosswise displacement of the nut thread 15 to the left, with reference to Fig. 2, there will occur a locking action between the crest of the nut thread and the root of the bolt thread 14, while locking action is avoided between the root of the nut thread and the crest of the bolt thread since the opposed locking surfaces at this point are separated. Upon relative crosswise displacement of the nut thread to the right, a locking action will occur between the root of the nut thread and the crest of the bolt thread, while locking action will be avoided between the crest of the nut thread and the root of the bolt thread due to separation of the opposed locking surfaces at the latter point. The design of the threads, providing for locking of each at its crest only in one limit of side-play and at its root only at the opposite limit of side-play, renders the threads more easy to manufacture, by avoiding the necessity of great accuracy in the corelation of the locking surfaces having the major diameter and those having the minor diameter. A full locking action at a thread crest may be had without interference at the thread root, and vice versa. The fact that each of the oppositely facing locking surfaces of a thread has only a single slope between the abutment surfaces further facilitates the forming of the thread.

While the abutment surface portions in the several forms of thread connections are shown as of zero curvature transversely of said surface portions they may be curved transversely, if desired; and abutment surface portions of zero curvature perpendicular to the axial line of the thread may be employed, if desired.

What I claim is:

1. A tight-holding screw element having a screw thread formed with oppositely facing, helicoidal, side-play-limiting abutment surface portions disposed abruptly to the axial line of the thread for engagement with a complementary thread, the thread rib having a helicoidal, thread-locking crest surface portion inclined transversely in one direction within the angle of friction relatively to the axial line, and the bottom of the thread groove having a helicoidal, thread-locking root surface portion inclined transversely relatively to the axial line within the angle of friction and in an opposite direction to the direction of inclination of the crest surface portion, the thread being formed for self-locking, jamming engagement of its crest surface portion only with a complementary thread within the limit of side-play in one direction, and for self-locking jamming engagement of its root surface portion only with the complementary thread within the limit of side-play in the opposite direction.

2. A tight-holding screw element having a screw thread formed with oppositely facing, helicoidal, side-play-limiting, abutment surface portions disposed abruptly to the axial line of the thread for engagement with a complementary thread, the thread rib having a helicoidal, thread-locking crest surface portion joining said abutment surface portions and inclined transversely in one direction relatively to the axial line of the thread from one abutment surface portion to the other and the bottom of the thread groove having a helicoidal, thread-locking surface portion joining the abutment surface portions of adjacent thread rib convolutions and inclining transversely from one to the other relatively to the axial line in an opposite direction to the direction of inclination of the crest surface portion to permit either of said thread-locking surface portions to be forced into self-locking jammed engagement with a complementary thread within the limits of side-play allowed by said abutment surface portions.

3. A tight-holding screw element having a screw thread formed with oppositely facing, helicoidal side-play-limiting, abutment surface portions disposed abruptly to the axial line of the thread for engagement with a complementary thread, the thread rib having a helicoidal, thread-locking crest surface portion inclined transversely in one direction relatively to the axial line of the thread across the middle point of the rib crest, and the bottom of the thread groove having a helicoidal, thread-locking, root surface portion inclined transversely relatively to the axial line in an opposite direction to the inclination of said crest surface across the middle point of the groove bottom, said crest and root thread-locking surfaces sloping relatively to the axial line at a sufficiently slight degree to permit either of said sloping surface portions to be forced into self-locking jammed engagement with a complementary thread within the limits of side-play allowed by said abutment surface portions.

4. In a thread lock of the superposed nut type, the combination of a member having an external thread of constant pitch, and a pair of superposed nuts screwed tightly one against the other on said member and having identical constant pitch threads of the same pitch as the thread of said member, one of which nut threads abuts one side face only of the external thread and is wedged on the crest only of said external thread while the other nut thread abuts the opposite side face only of the external thread and is wedged on the root only of said external thread, all of said threads having sufficient space between their convolutions to permit substantial crosswise displacement of the nut threads relatively to the external thread, and each of said threads having a crest face and a root face of opposite and slight slope crosswisely of the thread and also having side faces which connect said crest and root faces thereof and are sufficiently steep to prevent the sides of the nut threads from wedging on the sides of the external thread, the crest and root faces of the nut threads sloping in the same directions as the root and crest surfaces, respectively, of the external thread.

5. In a wedgeable screw thread connection, the combination of two members provided respectively with an external screw thread and an internal screw thread of equal and constant pitch each having a non-symmetrical profile and sufficient space between its convolutions to permit a substantial relative crosswise movement of said threads while they are screwed together, each thread having two side faces which are sufficiently steep to be non-wedgeable upon those of the other thread and which are connected by a crest face and a root face each of which slopes slightly and in a different direction from the other transversely of the thread, whereby when the members are screwed together with the crest and root faces of one thread opposed respectively to, and sloping in the same direction as, the root and crest faces of the other thread, different pairs of such opposed crest and root surfaces of the coupled threads are wedgeable upon each other by crosswisely displacing the threads in different directions into side face contact.

6. In combination, two members provided with coupling screw threads, said threads having space between their convolutions to permit substantial crosswise movement between the threads while coupled, the root surfaces of said threads of the two members being oppositely directed with respect to the longitudinal axis of the threaded member and the crest surfaces of the threads of the two members being formed to jam on the said root surfaces, to form profiles adapted to freely screw together only while the threads are out of side contact and to wedge the crest of one thread on the root of its co-acting thread when the threads are displaced crosswisely in one direction, and to wedge the crest of the other thread on the root of its co-acting thread when the threads are displaced crosswisely in the opposite direction.

7. In a thread lock, the combination of a member having an external thread of constant pitch, and a pair of nuts screwed on said member and having threads of the same pitch as the external thread of said member, and adapted to be locked thereon by oppositely directed thrusts on said nuts, one of which nut threads when locked abuts one side face of the external thread and is wedged on the crest only of said external thread while the other nut thread when locked abuts the opposite side face of the external thread and is wedged on the root only of said external thread, all of said threads having sufficient space between their convolutions to permit substantial crosswise displacement of the nut threads relatively to the external thread, said external thread of said member having a crest face and a root face of opposite and slight slope crosswisely of the thread and also having side faces which connect said crest and root faces thereof sufficiently steep to prevent the sides of the nut threads from wedging on the sides of the external thread, the crest face of the thread of one nut sloping in the same direction as the root surface of the external thread, and the root face of the other nut thread sloping in the same direction as the crest surface of the external thread.

In testimony whereof I hereunto affix my signature.

WILLIAM E. HOKE.